(12) United States Patent
Zhang et al.

(10) Patent No.: US 11,337,782 B2
(45) Date of Patent: May 24, 2022

(54) DENTAL IMPLANT DISTRACTOR

(71) Applicants: SHANGHAI NINTH PEOPLES HOSPITAL AFFILIATED SHANGHAI JIAOTONG UNIVERSITY SCHOOL OF MEDICINE, Shanghai (CN); SHANGHAI JINGTANG MEDICAL APPARATUS AND INSTRUMENTS LIMITED, Shanghai (CN)

(72) Inventors: Chenping Zhang, Shanghai (CN); Jiannan Liu, Shanghai (CN); Fuming Xu, Shanghai (CN); Xingzhou Qu, Shanghai (CN); Jizhuang Ma, Shanghai (CN)

( * ) Notice: Subject to any disclaimer, the term of this patent is extended or adjusted under 35 U.S.C. 154(b) by 423 days.

(21) Appl. No.: 16/492,617

(22) PCT Filed: Dec. 27, 2017

(86) PCT No.: PCT/CN2017/119101
§ 371 (c)(1),
(2) Date: Sep. 10, 2019

(87) PCT Pub. No.: WO2018/137461
PCT Pub. Date: Aug. 2, 2018

(65) Prior Publication Data
US 2021/0322137 A1   Oct. 21, 2021

(30) Foreign Application Priority Data
Jan. 24, 2017  (CN) .......................... 20170059450.1

(51) Int. Cl.
*A61C 8/00* (2006.01)
(52) U.S. Cl.
CPC .................................. *A61C 8/0089* (2013.01)

(58) Field of Classification Search
CPC ... A61C 8/0089; A61C 8/0092; A61C 8/0006; A61C 8/0022; A61C 8/0033;
(Continued)

(56) References Cited

U.S. PATENT DOCUMENTS 6,491,696 B1 * 12/2002 Kunkel ................ A61B 17/666
606/105
2007/0105068 A1  5/2007 Stucki-McCormick
2009/0220915 A1  9/2009 Kyonov

FOREIGN PATENT DOCUMENTS

CN          2547284 Y    1/2003
CN        202355474 U    8/2012
(Continued)

OTHER PUBLICATIONS

Chenping Z, Min R, Liqun X, Yongjie H, Wenjun Y, Tong J, Xingzhou Q, Siyi L, Ow A, Jizhuang M, Yiqun W,Dental Implant Distractor Combined With Free Fibular Flap: A New Design for Simultaneous Functional Mandibular Reconstruction,journal,Nov. 30, 2012,p. 2687-2700,vol. 70-Issue 11,American Association of Oral and Maxillofacial Surgeons,USA.

*Primary Examiner* — Nicholas D Lucchesi
*Assistant Examiner* — Mirayda A Aponte

(57) ABSTRACT

Disclosed is a dental implant distractor, including an implant module and a traction module. The implant module includes an implant, a sealing screw, and a base body. The traction module includes a connecting screw rod, a traction screw rod, an inner sleeve, and an outer sleeve; the connecting screw rod is threadedly connected to the base body; the traction screw rod is located below the connecting screw rod; the inner sleeve is provided below the base body. This apparatus can automatically complete the installation of the base body and the sealing of the connecting screw rod after traction is completed; since the installation of the base body and the sealing do not need to be performed again, operation (Continued)

steps are simplified, the clinical operation difficulty is reduced, and the problem of slippage of an upper bone section to the original position is avoided.

4 Claims, 3 Drawing Sheets

(58) Field of Classification Search
CPC ....... A61C 8/0017; A61C 8/00; A61B 17/663; A61B 17/666; A61B 17/66; A61B 17/8071; A61B 17/8004; A61B 17/8875; A61B 17/885; A61B 17/7216; A61B 17/3468; A61B 17/176; A61B 17/8866; A61B 2017/681; A61B 2017/00991
USPC .......................................................... 433/173
See application file for complete search history.

(56) References Cited

FOREIGN PATENT DOCUMENTS

| | | | | |
|---|---|---|---|---|
| CN | 106618769 | A | 5/2017 | |
| CN | 206852669 | U | 1/2018 | |
| DE | 102008056104 | A1 | 5/2010 | |
| EP | 1302175 | B1 | 7/2007 | |
| KR | 100785660 | B1 | 12/2007 | |
| WO | 9901080 | A1 | 1/1999 | |
| WO | 2007120062 | A1 | 10/2007 | |
| WO | WO-2009085023 | A1 * | 7/2009 | ........... A61B 17/666 |

* cited by examiner

DENTAL IMPLANT DISTRACTOR

CROSS-REFERENCE TO RELATED APPLICATION(S)

This application claims the benefits of Chinese Patent Application No. 201710059450.1, filed on Jan. 24, 2017, and International Application PCT/CN2017/119101, filed on Dec. 27, 2017, each of which is incorporated by reference in its entirety.

BACKGROUND OF THE INVENTION

1. Field of the Invention

The present invention relates to a medical device, and more particularly, relates to a jawbone traction and implant device used in the oral and maxillofacial reconstruction surgery.

2. Description of the Prior Art

At present, a jawbone traction and implant device used in the oral and maxillofacial reconstruction surgery is a built-in traction and implant device (Patent No. 01238497.6) designed and developed by the applicant in 2001. The device integrates jawbone traction and dental implantation, and includes a longitudinal traction implant composed of an implant, a cover screw and a fixed blade, and a guide sleeve composed of a lifting screw rod, a connecting sleeve and a stationary blade. Its principle is that: an external thread of the implant is used to fix an upper bone section, and an internal thread of the connecting sleeve is used to conduct thrust on the lifting screw rod. When the lifting screw rod rotates counterclockwise in the guide sleeve, the upper bone section is pushed upward.

The device has the following disadvantages: 1. the fixation between the implant and the upper bone section is unstable, and requires the help of the fixed blade to retain; and the guide sleeve needs to be removed by a secondary surgery after the implant is stabilized, so that increasing the surgical trauma and operation difficulty of the second operation; 2. after the removal of the guide sleeve, the soft tissue will enter from the bottom of the implant and cause the tissue inflammation and even retrograde infection around the implant; 3. after the removal of the guide sleeve, the upper traction bone section often retreats to its original place, so that resulting in traction failure; 4. the device is only fixed with the upper bone section, and is not stably fixed with the lower bone section, so that increasing the instability of the implant.

The applicant designed a dental implant distractor (DID) (Chenping, Z., et al., Dental implant distractor combined with free fibular flap: a new design for simultaneous functional mandibular reconstruction. J Oral Maxillofac Surg, 2012.70(11):p. 26 87-700.) in 2012. Based on the analysis of the results of animal and clinical experiments, a dental implant tractor was developed. The device not only retains the characteristics of the jawbone built-in traction and implant device, but also reduces the operation difficulty and trauma by removing the fixed blades, and improves the stability of implants by installing a base screw. The device mainly includes an implant, a cover screw, a longitudinal traction implant composed of a base screw and a retaining screw, and a traction device composed of a traction sleeve, a screw rod and a traction cap.

The improved device still has the following shortcomings: 1. although the stability of the implant is enhanced by adding the base screw, the process of removing the traction sleeve and replacing the base screw is complicated; and doctors often fail to determine the original position of the base screw after removing the traction sleeve; 2. after pulling out the traction sleeve, sometimes the upper bone section goes back to the position before traction, which affects the traction effect; 3. the base screw and the retaining screw can improve the stability of the implant and the lower bone, but when the tissue inflammation around the implant occurs in implant dentures, secondary surgery is often needed to remove the upper and lower structures of the implants simultaneously, which greatly increases the surgical trauma.

BRIEF SUMMARY OF THE INVENTION

A first object of the present invention is to provide a dental implant distractor, which can automatically close a lower end of an implant after the traction is completed and does not need to install a base body again.

To achieve the aforementioned object of the present invention, the present invention discloses the following technical solution. A dental implant distractor comprises an implant module and a traction module; characterized in that: the implant module including an implant, a sealing screw, and a base body; the sealing screw being connected to an upper end of the implant for sealing a cavity at the upper end of the implant; the base body being movably connected to a lower end of the implant; a lower end of the base body being provided with an internal thread; the traction module including a connecting screw rod, a traction screw rod, an inner sleeve and an outer sleeve; the connecting screw rod being connected to the base body; the traction screw rod being located under the connecting screw rod; the inner sleeve being located under the base body; the inner sleeve guiding the traction screw rod to push the connecting screw rod in a traction process; the outer sleeve being located outside the inner sleeve for connecting the inner sleeve and the base body.

As a preferred embodiment, the connecting screw rod includes a connecting end and a closed end; a diameter of the connecting end is smaller than that of the closed end; the connecting end can be inserted into a cavity of the lower end of the implant, and the closed end is provided with an external thread.

As a preferred embodiment, a length of the closed end of the connecting screw rod is the same as that of the internal thread of the lower end of the base body. The connecting screw rod is connected to the lower end of the implant. In the traction process, the connecting screw rod pushes the implant vertically upward, and after traction, they can be fixed on a lower bone section. It should be noted that when the connecting screw rod rotates and does not move, it indicates that it is pulled in place. A maximum point of traction is reached and the connecting screw rod is locked. Moreover, the same length also ensures that the connecting screw rod can fully enter into the base body when the traction is in place, without protrusion or depression As a preferred embodiment, the connecting screw rod is provided with a groove on a bottom of the connecting screw rod. The traction screw rod is provided with a protrusion thereon. The groove of the connecting screw rod can be engaged with the protrusion of the traction screw rod. During the traction, the traction screw rod can push the connecting screw rod to move up for completing the traction. When the traction is in place, the traction screw rod can be automatically separated from the connecting screw rod.

As a preferred embodiment, the upper end of the implant and the base body are provided with the external thread, which can be combined with a bone. The external thread combined with the bone is different from a common thread. Shallow spiral groove and large pitch of the external thread of the present invention are beneficial to the stability of the bone.

The advantages of the present invention are as follows: (1) after the traction is completed, the base body is automatically installed and the implant is automatically closed, so it does not need to install the base body again for closing, thereby simplifying the operation steps, reducing the difficulty of clinical operation, and avoiding the problem of the upper bone slipping back to its original position; (2) because the connection between the implant and the base body is non-fixed, once the tissue inflammation around the implant occurs, the implant can be removed separately, which avoids the trauma and economic burden caused by the second operation; (3) the design of the outer sleeve not only facilitates the operation, but also skillfully connects the inner sleeve with the base body; when the traction is completed, the outer sleeve is rotated and removed, and the inner sleeve can be naturally separated from the base body.

Wherein,
1—implant module
2—traction module
11—implant
12—sealing screw
13—base body
21—connecting screw rod
22—traction screw rod
23—inner sleeve
24—outer sleeve
131—external thread combined with a bone
132—internal thread of a lower end of the base body
211—connecting end
212—closed end
213—external thread of the closed end
214—groove

DETAILED DESCRIPTION OF THE PREFERRED EMBODIMENTS

The present invention is further described in connection with specific embodiments. The experimental methods used in the following embodiments are conventional methods without special description. Materials and reagents, etc. used in the following embodiments can be obtained from commercial channels without special description. It should be understood that these embodiments are used only to illustrate the invention and not to limit the scope of the invention.

Embodiment 1

Figure 1:
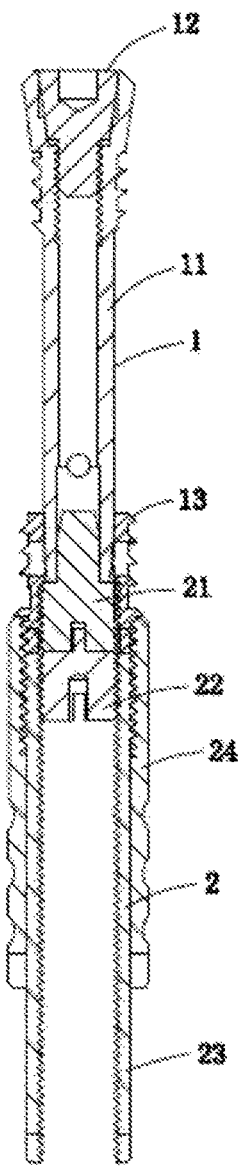
FIG. 1 is a schematic view of a dental implant distractor when it is pulled in place.

Please refer to FIG. 1, FIG. 1 is a schematic view of a dental implant distractor when it is pulled in place. The dental implant distractor includes an implant module 1 and a traction module 2. The implant module 1 includes an implant 11, a sealing screw 12, and a base body 13. The sealing screw 12 is connected to an upper end of the implant 11 for sealing a cavity at the upper end of the implant. The base body 13 is movably connected to a lower end of the implant 11 when traction is in place. A lower end of the base body 13 is provided with an internal thread. The traction module 2 includes a connecting screw rod 21, a traction screw rod 22, an inner sleeve 23 and an outer sleeve 24. The connecting screw rod 21 is connected to the base body 13. The traction screw rod 22 is located under the connecting screw rod 21. The inner sleeve 23 is located under the base body 13. In a traction process, the inner sleeve 23 guides the traction screw rod 22 to push the connecting screw rod 21 to be in position. The outer sleeve 24 is located outside the inner sleeve 23 for connecting the inner sleeve 23 and the base body 13.

Figure 2:
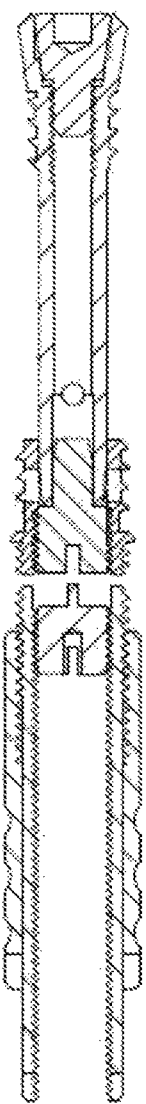
FIG. 2 is a schematic view showing that an outer sleeve is removed when traction is completed.

When in use, the base body 13 and the implant 11 are respectively fixed on a sawn fibula. A cross head of a traction screwdriver inserts into a traction screw and rotates to the right, thereby driving the connecting screw rod 21 to move up the implant 11 and an upper fibula to achieve traction. When the connecting screw rod 21 is screwed into the base body 13 and is locked by thread, then the traction is completed. FIG. 2 is a schematic view showing that the outer sleeve is removed when the traction is completed. Specifically, rotate the outer sleeve 24 to the left, release the outer sleeve 24 from the base body 13, and pull out the inner sleeve 23 and the traction screw rod 22 downward.

Figure 4:
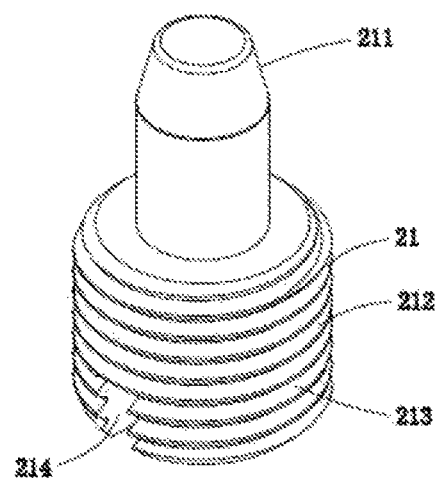
FIG. 4 is a schematic view of one preferred embodiment of a connecting screw rod.

FIG. 4 is a schematic view of one preferred embodiment of the connecting screw rod. The connecting screw rod 21 includes a connecting end 211 and a closed end 212. A diameter of the connecting end 211 is smaller than that of the closed end 212. The connecting end 211 can be inserted into a cavity of the lower end of the implant 11, and the closed end 212 is provided with an external thread 213.

Figure 3:
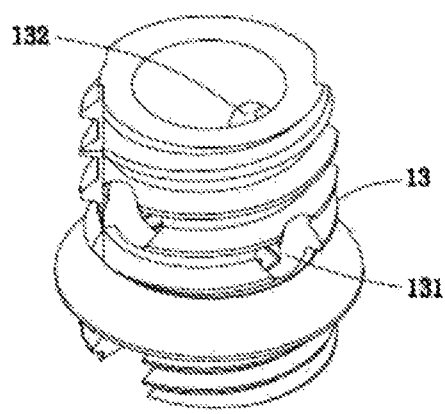
FIG. 3 is a schematic view of one preferred embodiment of a base body.

FIG. 3 is a schematic view of one preferred embodiment of the base body. The base body 13 is provided with an external thread 131 that can be combined with a bone, and an internal thread on the lower end thereof. A length of the closed end 212 of the connecting screw rod 21 is the same as that of the internal thread 132 of the lower end of the base body 13. The connecting screw rod 21 is connected to the lower end of the implant 11. In the traction process, the connecting screw rod 21 pushes the implant vertically upward, and after traction, they can be fixed on a lower bone section. A length of the closed end 212 of the connecting screw rod 21 is the same as that of the internal thread 132 of the lower end of the base body 13. It should be noted that when the connecting screw rod 21 rotates and does not move, it indicates that it is pulled in place. Namely, a maximum point of traction is reached and the connecting screw rod 21 is locked. Moreover, the same length also ensures that the connecting screw rod 21 can fully enter into the base body 13 when the traction is in place, without protrusion or depression.

As a preferred embodiment, the connecting screw rod 21 is provided with a groove 214 on the bottom thereof, and the traction screw rod is provided with a protrusion thereon. The groove of the connecting screw rod can be engaged with the protrusion of the traction screw rod. During the traction, the traction screw rod can push the connecting screw rod to move up for completing the traction. When the traction is in place, the traction screw rod can be automatically separated from the connecting screw rod.

As a preferred embodiment, the upper end of the implant 11 and the base body 13 are provided with the external thread, which can be combined with the bone. The external thread combined with the bone is different from a common thread. For the external thread of the present invention, shallow spiral groove and large pitch are beneficial to the stability of the bone.

The above is only the preferred embodiment of the present invention. It should be pointed out that for ordinary technicians in the technical field, without departing from the principles of the present invention, a number of improvements and finishing can also be made, and these improvements and finishing should also be considered as the scope of protection of the present invention.

What is claimed is:

1. A dental implant distractor, comprising an implant module and a traction module; characterized in that: the implant module including an implant, a sealing screw, and a base body; the sealing screw being connected to an upper end of the implant for sealing a cavity at the upper end of the implant; the base body being movably connected to a lower end of the implant; a lower end of the base body being provided with an internal thread; the traction module including a connecting screw rod, a traction screw rod, an inner sleeve and an outer sleeve; the connecting screw rod being connected to the base body; the traction screw rod being located under the connecting screw rod; the inner sleeve being located under the base body; the inner sleeve guiding the traction screw rod to push the connecting screw rod in a traction process; the outer sleeve being located outside the inner sleeve for connecting the inner sleeve and the base body;

wherein the connecting screw rod includes a connecting end and a closed end; a diameter of the connecting end being smaller than that of the closed end; the connecting end being capable of being inserted into a cavity of the lower end of the implant, and the closed end being provided with an external thread.

2. The dental implant distractor as claimed in claim 1, characterized in that, a length of the closed end of the connecting screw rod is the same as that of the internal thread of the lower end of the base body.

3. The dental implant distractor as claimed in claim 1, characterized in that, the connecting screw rod is provided with a groove on a bottom of the connecting screw rod.

4. The dental implant distractor as claimed in claim 1, characterized in that, the upper end of the implant and the base body are provided with the external thread, which can be combined with a bone.

\* \* \* \* \*